July 9, 1940.　　　L. M. VILES ET AL　　　2,207,447
MOTOR TRUCK
Filed June 13, 1938　　　6 Sheets-Sheet 2

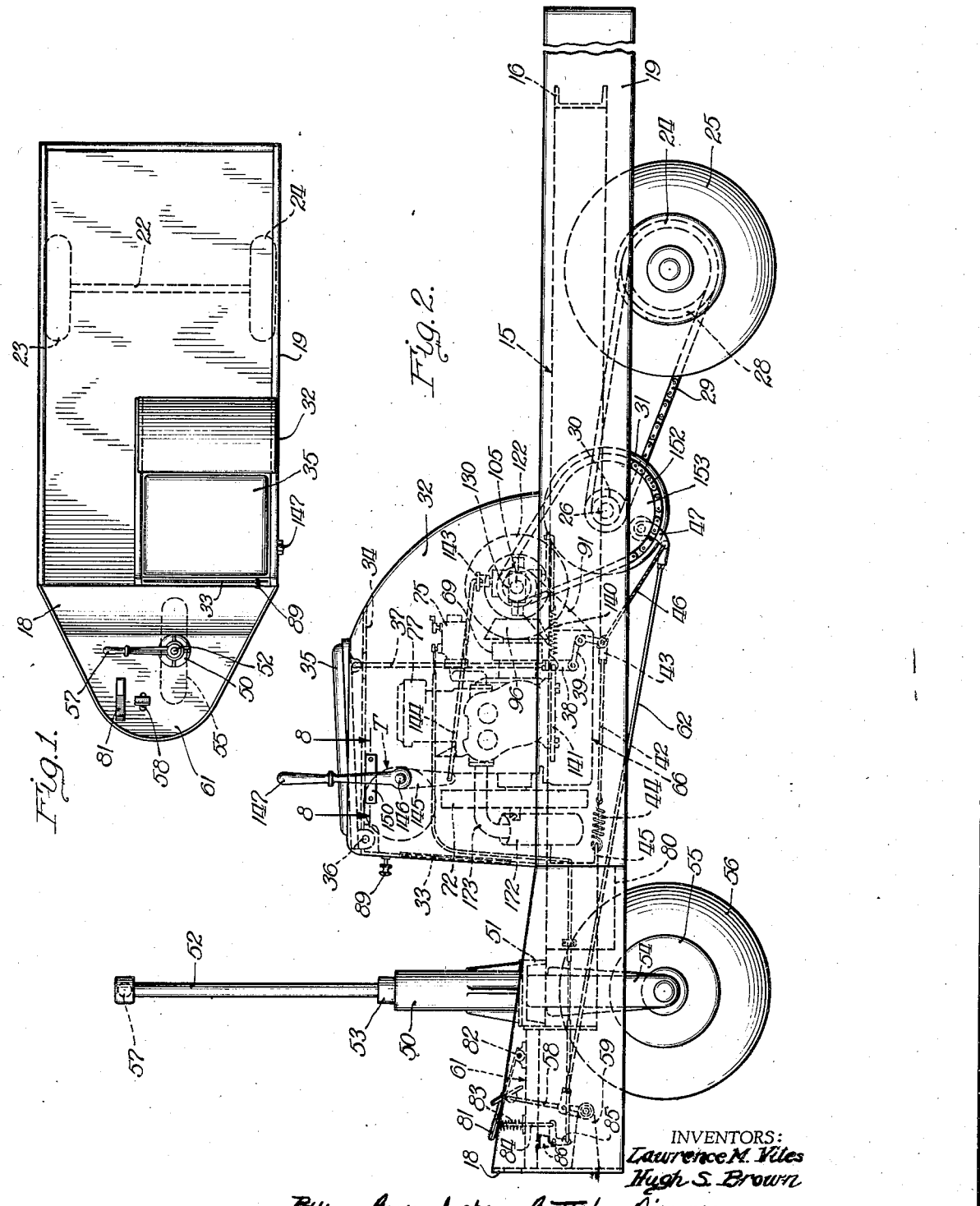

INVENTORS:
Lawrence M. Viles
Hugh S. Brown
By: Brown, Jackson, Boettcher & Dienner
ATTORNEYS.

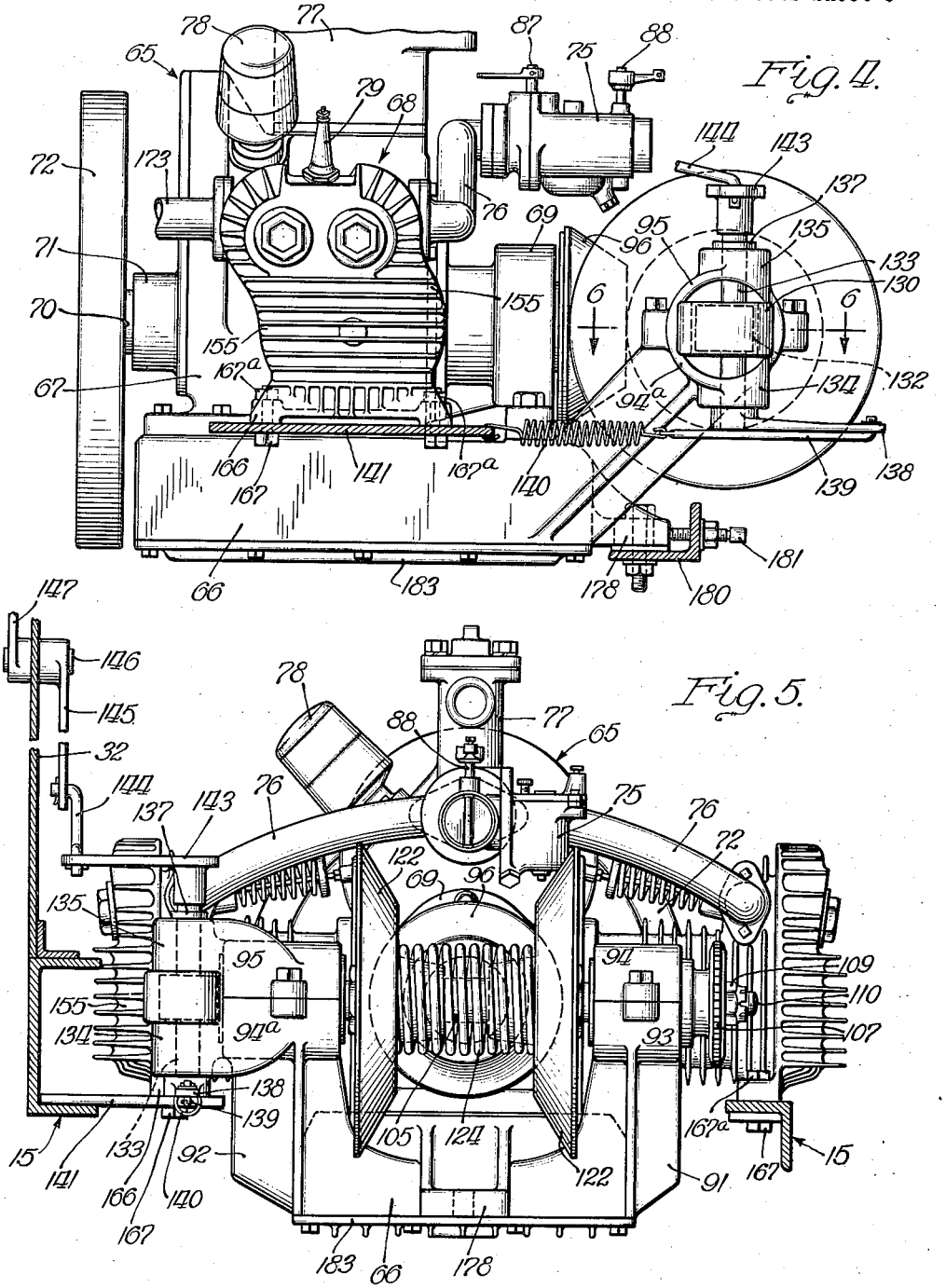

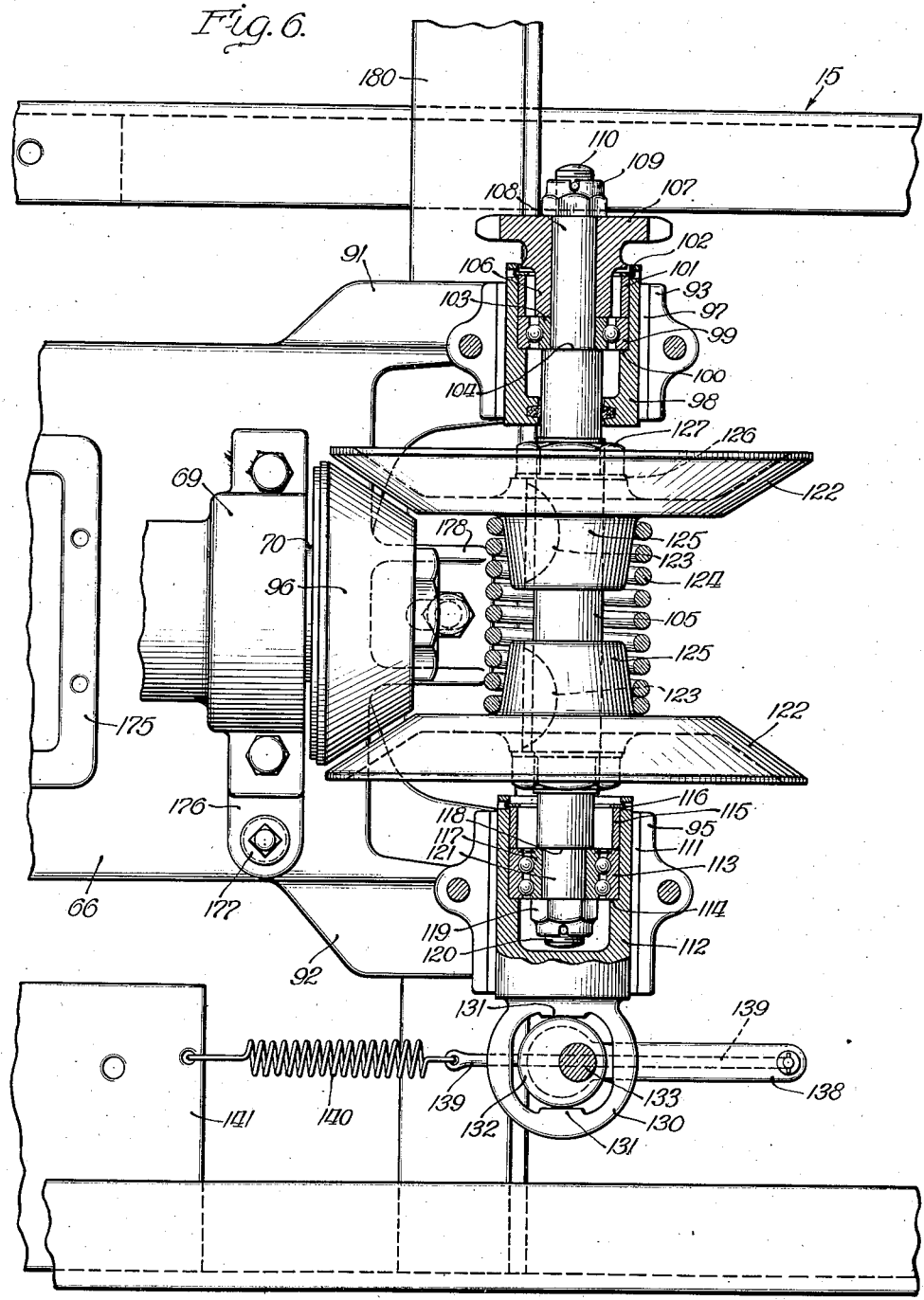

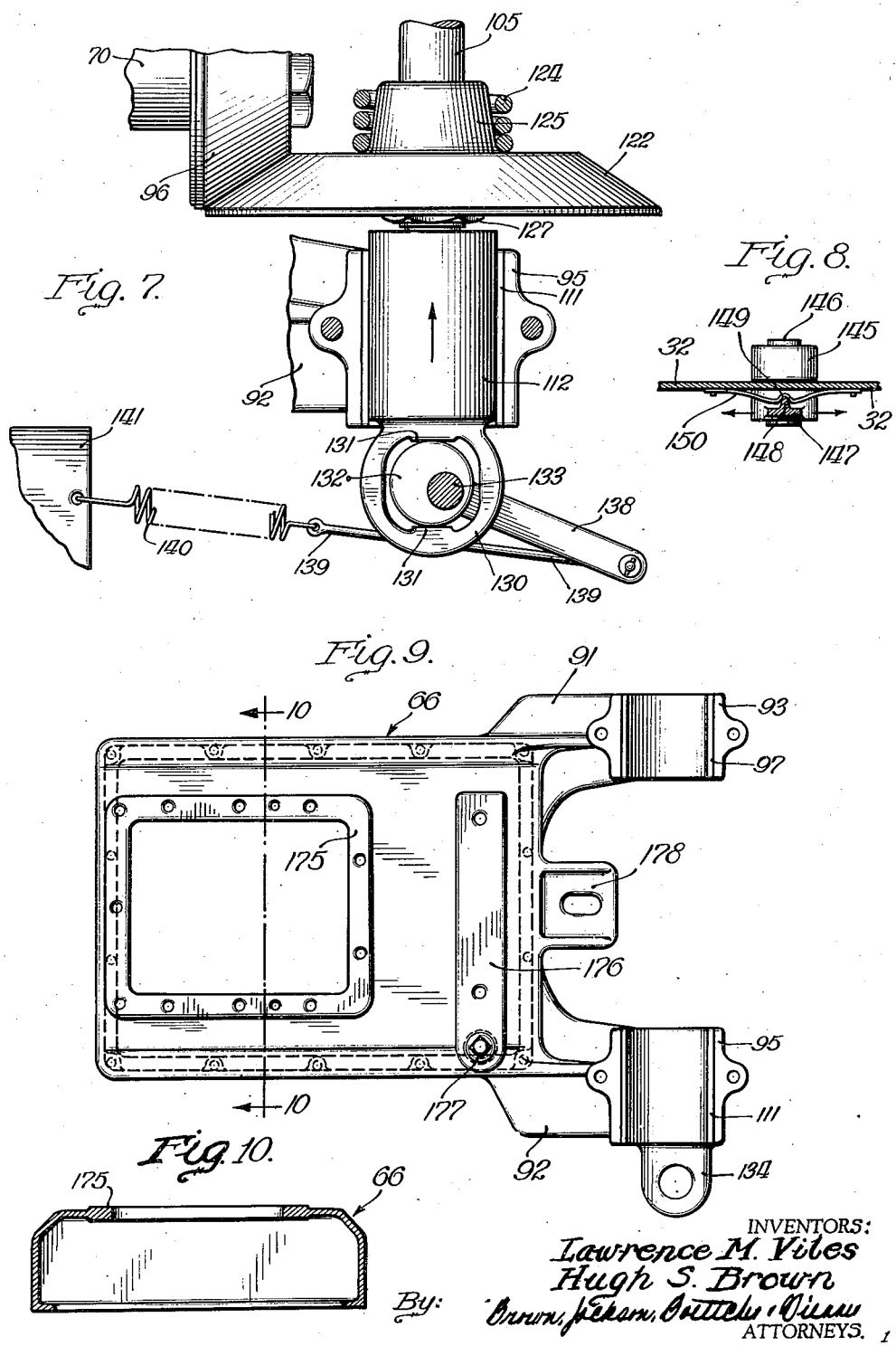

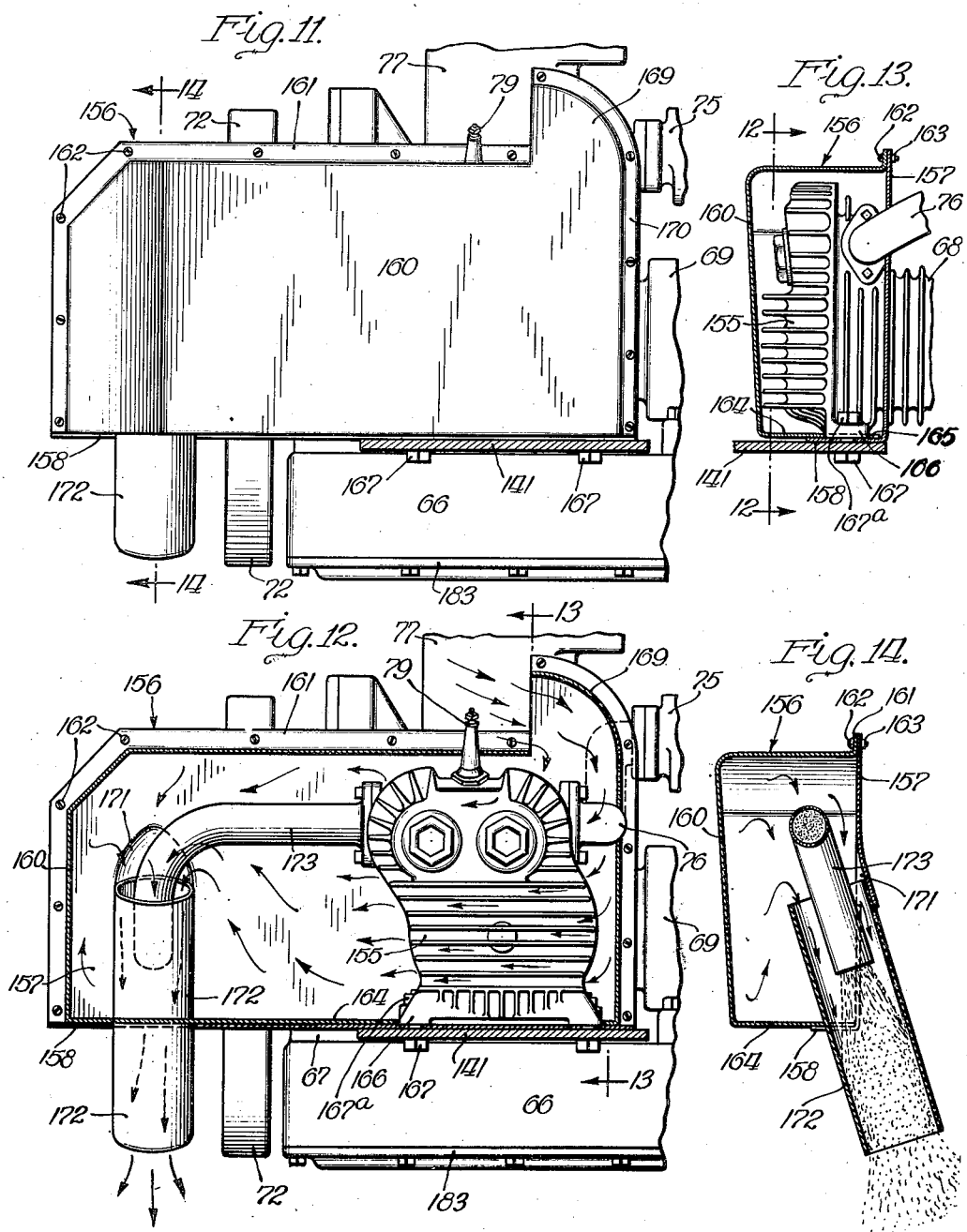

Patented July 9, 1940

2,207,447

UNITED STATES PATENT OFFICE 2,207,447

MOTOR TRUCK

Lawrence M. Viles, Chicago, and Hugh S. Brown, Harvey, Ill., assignors to The Buda Company, Harvey Ill., a corporation of Illinois Application June 13, 1938, Serial No. 213,362

10 Claims. (Cl. 180—27)

This invention relates to motor driven vehicles. While the specific embodiment herein shown is a truck intended for use in industrial establishments, it is to be understood that the invention is not to be limited to any specific use. Certain features are, furthermore, of general application.

The preferred embodiment of our invention, herein shown, comprises a truck of the character stated of rugged construction, which has a low center of gravity, requires but slight floor clearance, is capable of making turns of short radius, has an adequate power plant, will not stall under conditions ordinarily encountered in use and reduces fire hazard; all desirable characteristics in industrial trucks. More specifically, we provide an internal combustion engine of improved construction, air cooled in a novel manner eliminating necessity of using a fan or other power consuming cooling means, in association with novel transmission and control means, to the end of utilizing to maximum advantage the power output of the engine for starting and propelling the truck, while enabling starting from standstill with heavy load and without stalling of the engine. We also provide novel brake operating and control means effective for braking the truck and preventing accidental starting thereof if it is left unattended with the motor running. A further feature of importance is the power unit and associated transmission means, so constructed as to assure accuracy in assembly and providing a variable slip drive under direct control of the operator, for starting, of such character that the operator can readily determine the amount of slippage occurring and regulate it to suit requirements, while assuring that the cooperating elements of the transmission will be locked in predetermined driving pressure contact one with the other during normal travel of the truck. The power unit is disposed adjacent one side of the truck, within a hood carrying the operator's seat, and steering is accomplished by a dirigible front wheel disposed nearer that side of the truck than the other side thereof, with a view to providing at the other side of the truck an unobstructed deck for articles of considerable length, while assuring stability and facilitating the making of short turns.

In the drawings:

Figure 1 is a plan view of a truck embodying our invention;

Figure 2 is a side view, on an enlarged scale and partly broken away, of the truck of Figure 1;

Figure 4 is a side view, on an enlarged scale and with certain parts broken away, of the power plant comprising the engine and transmission and associated parts, as viewed from the left hand side of the engine, certain parts of the truck frame being shown in section;

Figure 5 is a back view of the power plant of Figure 4, certain parts being broken away and certain parts of the truck frame and hood being shown in section;

Figure 6 is a sectional view through the transmission, on an enlarged scale, taken substantially on line 6—6 of Figure 4, certain parts being shown in plan and certain other parts being broken away, certain elements of the truck frame being shown in plan;

Figure 7 is fragmentary view on the order of Figure 6 but showing one of the transmission cones in driving contact with the drive cone;

Figure 8 is a fragmentary sectional view, on an enlarged scale, taken substantially on line 8—8 of Figure 2;

Figure 9 is a plan view of the oil pan;

Figure 10 is a sectional view taken substantially on line 10—10 of Figure 9;

Figure 11 is a side view, with parts broken away, of the engine with the cooling means applied thereto, as viewed from the left hand side of the engine;

Figure 12 is a sectional view taken substantially on line 12—12 of Figure 13;

Figure 13 is a sectional view taken substantially on line 13—13 of Figure 12; and Figure 14 is a sectional view taken substantially on line 14—14 of Figure 11.

Figure 3:
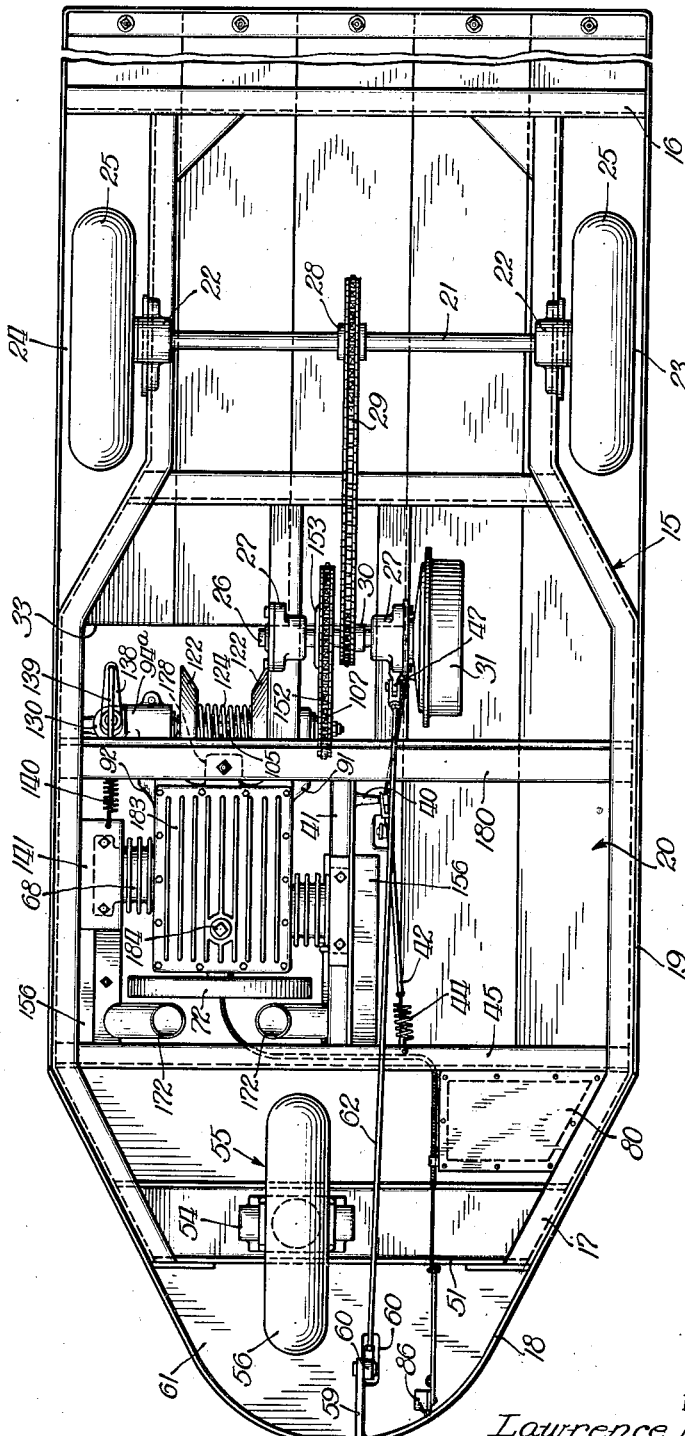
Figure 3 is an underneath view, partly broken away, of the truck of Figure 2.

The truck comprises a frame 15 of angle and channel iron construction, generally rectangular in plan and of reduced width at its rearward portion, which supports a channel member 16 equal in length to the width of the main portion of frame 15, the latter having a forward tapering portion 17, from which extends a front member 18 of rounded V-shape in plan constituting a nose member. A depending skirt 19 of sheet metal extends about the frame defining the outline thereof. The elements of the frame may be secured together by welding or in any other suitable manner, and the frame and associated parts are suitably connected together and braced in appropriate manner. Frame 15 carries a platform 20 constructed of any suitable material, preferably of wood and formed of boards of suitable thickness. This platform may be provided with an appropriate covering of sheet metal. The rounded nose 18 of the frame may conveniently be used for pushing open swinging doors, and for analogous purposes, in the travel of the truck.

A rear axle 21 is rotatably mounted in journal boxes 22 appropriately fixed on frame 15, this axle carrying two ground wheels 23 and 24 disposed adjacent the side of the frame but within the outline of skirt 19. Each of the ground wheels is provided with a pneumatic tire 25 of ample proportions for cushioning the truck in the travel thereof, these tires, due to their yielding characteristics, reducing likelihood of stalling of the truck due to the wheels encountering articles on the factory floor, of appreciable height and which would be apt to cause stalling of the truck if the latter were provided with solid or nonyielding tires or wheels. In order to facilitate turning of the truck and prevent objectionable wear of the tires 25, one of the wheels, preferably wheel 23, is free to turn on the axle 21 and the other wheel 24 is fixed to axle 21 to be driven thereby. The mounting of the wheels upon the axle in the manner stated may be accomplished in any suitable manner and need not be illustrated nor described in greater detail, it being sufficient to note that one wheel, preferably wheel 23, is free from axle 21 for rotation relative thereto, the other wheel 24 being fixed to axle 21 to be driven thereby.

A horizontally disposed countershaft 26 is rotatably mounted, at the mid-portion of frame 15, in bearing boxes 27 appropriately secured to the frame, this countershaft being disposed in front of and parallel with axle 21. The latter has a sprocket wheel 28 secured thereon, in a known manner, about which passes a sprocket chain 29, this chain also passing about a sprocket wheel 30 secured upon countershaft 26. This latter shaft has associated therewith, at one end thereof, brake means which may be of any suitable type. We have shown, by way of example, an expanding type of brake means comprising a drum 31 within which are disposed cooperating brake shoes normally held in inoperative position and moved into operative position by appropriate operating means which will be described more in detail presently. The brake means may be of any suitable known construction and need not be illustrated nor described here in greater detail.

An engine hood 32, of suitable construction, extends upward from platform 20, about a rectangular opening 33 (Figure 3) through the platform adjacent one side and the front thereof. The front of hood 32 is provided with a screen 33 and is otherwise open for entry of air. Adjacent its upper end hood 32 is provided with a seat deck 34 above which is disposed a seat 35 hinged at its front, at 36, in the hood for rocking movement about an axis extending transversely of the truck. Seat 35 is connected, adjacent its rear end, by a link 37 and shackle 38, to the forward end of the upper arm of an angle lever 39 pivoted on a post 40 suitably secured, as by welding, to a frame member 41. A rod 42 is connected at its rearward end, by a shackle 43, to the lower end of the other arm of lever 39, the forward end of rod 42 being connected, by a tension spring 44, to a cross frame member 45. It will be seen (Figure 2) that seat 35 normally is held raised by tension spring 44. The lower arm of lever 39 is also connected, by a cable 46, to brake operating arm 47 associated with the brake drum and the cooperating brake means enclosed thereby. The length of cable 46 and the strength of tension spring 44 are such that, when seat 35 is in its raised position, brake arm 47 is moved forward a sufficient distance to apply the brake in a manner effective to prevent operation of the truck. That acts as a safeguard to eliminate possibility of accidental starting of the truck in the event it should be left unattended with the engine running.

A steering post 50 is suitably secured to, and extends upward from, a channel member 51 secured to and extending across the front of frame 15. A steering rod 52 is rotatably mounted in post 50 and is held against downward movement therethrough by a stop collar 53 suitably secured on rod 52. At its lower end rod 52 is secured to a fork 54 in which is rotatably mounted a dirigible front steering wheel 55 provided with a pneumatic tire 56 similar to the tires 25 of the rear ground wheels. A handle 57, secured upon the upper end of rod 52, is disposed for ready access by the truck driver or operator seated upon the seat 35. It will be noted that steering post 50 and rod 52 are disposed nearer that side of the truck at which hood 32 is disposed than the other side of the truck and are within the lateral confines of hood 32, as is the front steering wheel 55 when the latter is disposed in its normal straight forward position.

A brake pedal 58 is pivoted at its lower end, on a bracket 59 projecting rearward from nose member 18, and extends upward through a slot 60 formed in a platform or deck 61 of member 18. Brake pedal 58 is connected, by a brake rod 62, to brake arm 47. When the operator is seated upon the seat 35, maintaining it depressed, the brake may be operated by means of pedal 58, since the cable 46 is flexible and presents no objectionable interference to operation of the brake by means of the pedal. The brake may thus be operated in the usual manner when driving the truck and is automatically applied, in the manner previously described, when the operator is not in position upon the seat 35.

An internal combustion engine 65 is disposed within hood 32. This engine comprises an oil pan 66, a crank case 67 bolted to the oil pan, and cylinders 68 bolted to crank case 67 at opposite sides thereof, the engine shown being a two cylinder opposed piston engine with the cylinders thereof disposed horizontally. Engine 65 is suitably mounted upon the truck frame 15, in the manner illustrated or in any other suitable manner. A cylindrical bearing housing 69 is bolted to the rearward end of crank case 67 and receives the rearward portion of the engine crank shaft 70, the forward portion of which extends through a bearing box 71 at the front of the engine, a fly wheel 72 being secured upon the front end of crank shaft 70. Engine 65 is provided with a carburetor 75 from which intake conduits 76 extend to the cylinders 68, a breather device 77 connected to the crank case, a distributor 78, spark plugs 79, valves and valve operating means, and appurtenant parts, as will be understood and which are well known in the art and need not be illustrated nor described here in detail. Conveniently, the truck is provided with a battery box 80 which may contain a dry battery as the source of electric current for the spark plugs 79. Any other suitable source of electricity for that purpose may be provided. An accelerator pedal 81 is pivoted at 82 upon deck 61 of nose member 18, and normally is held raised by a compression spring 83 disposed about a rod 84 slidable through deck 61, pedal 81 resting upon the upper end of this rod. The lower end of rod 84 is pivoted to one arm of a bell crank lever 85 pivoted on a bracket 86 depending from deck 81. The other arm of bell crank lever 85 is suitably connected, in a known manner, to throttle valve 87 of the carburetor 75. The latter is also provided with the usual choke valve 88 connected, in a known manner, to a choke control rod 89 slidably mounted in hood 32, at the front thereof, adjacent seat 35. The accelerator pedal and the brake pedal are disposed adjacent each other and in front and to the right of the steering post, being readily accessible to an operator upon seat 35 for controlling the drive of the truck.

Two arms 91 and 92 extend upwardly and rearwardly from oil pan 66 and are formed integrally therewith. Arm 91 carries, at its upper end, a bearing sleeve member 93 which cooperates with a cap 94, bolted thereto, to provide a bearing sleeve supported by arm 91. This bearing sleeve is disposed coaxially with a bearing sleeve carried by arm 92, comprising a lower section 94ª and a cap 95 bolted thereto. A friction drive cone 96 is secured upon the rearward end of crank shaft 70, arms 91 and 92 projecting beyond this end of the crank shaft at opposite sides thereof and the common axis of the bearing sleeves carried by these arms being perpendicular to and in the plane of the axis of the crank shaft. The bearing sleeve comprised of members 93 and 94 is provided with a sectional liner 97, which slidably receives a cylindrical member 98 within which is mounted a ball bearing 99, confined between an interior shoulder 100 in member 98 and a collar 101 fitting in the outer end of member 98 and held against outward movement therein by a retaining ring 102 of known type. Inner race 103 of ball bearing 99 is confined between a shoulder 104 of a transmission shaft 105, extending through member 98 coaxially therewith, and hub 106 of a sprocket wheel 107 splined upon a reduced end portion 108 of shaft 105. Sprocket wheel 107 is confined between cage 103 and a castle nut 109, threaded upon a reduced screw stud 110 at the outer end of portion 108 of shaft 105. The other bearing sleeve carried by arm 92 and comprising the sections 94ª and 95, is provided with a sectional liner 111 which slidably receives a bearing member 112, within which is disposed a ball bearing 113, confined between an interior shoulder 114 of member 112 and a collar 115 fitting within the inner end portion of member 112 and confined against inward movement, by a retaining ring 116 of known type and in a known manner. Inner race 117 of ball bearing 113 is confined between a shoulder 118 of shaft 105, and a nut 119 threaded upon a reduced screw stud 120, at the outer end of reduced portion 121 of shaft 105. The latter shaft is thus mounted for rotation on the arms 91 and 92 and for lengthwise movement relative to these arms. Forming arms 91 and 92 integrally with the oil pan 66 is advantageous, as assuring accurate alignment of the bearing sleeves carried by these arms and facilitating assembling and mounting of the transmission shaft 105 and associated parts.

Two opposed friction transmission cones 122 are feathered upon shaft 105, by means of keys 123, at opposite sides of the drive cone 96, the latter being provided with a wearing friction surface and the friction surfaces of the cones 122 being non-wearing. A coil compression spring 124 is confined between cones 122, about the hubs 125 thereof, and holds the cones spaced apart in contact with washers 126 confined between the outer ends of the hubs of the cones and nuts 127 threaded upon shaft 105. The spring 124 and the nuts 127 provide convenient means for effecting adjustment of the cones 122 and maintaining them in such adjustment. Normally shaft 105 is in neutral position with the cones 122 out of contact with cone 96, as shown in Figure 6.

Member 112 is provided, at its outer end, with an integral yoke 130 substantially circular in plan, as shown in Figures 6 and 7. This yoke 130 is provided with two diametrically opposite inwardly extending cam elements 131 which contact a disc cam 132 disposed within the yoke. Disc cam 132 is eccentrically secured upon a shift rod 133, rockably mounted through bearing bosses 134 and 135 formed integrally with bearing sleeve sections 94ª and 95, respectively, at the outer end thereof. Rod 133 is disposed vertically, as shown in Figures 3 and 4, and is limited against downward movement by a stop collar 137 secured thereon and contacting the upper face of boss 135. An arm 138 is secured on the lower end of rod 133 and has pivoted thereto one end of a link 139, to the other end of which is attached one end of a tension coil spring 140, the other end of this spring being attached to a filler plate 141, to which the outer cylinder of the engine is bolted, as shown in Figures 3 and 4, plate 141 being suitably secured, as by welding, to the left hand side rail of frame 15. In the neutral position of transmission shaft 105 tension spring 140 is in dead center position with relation to its point of attachment to plate 141, shift rod 133 and the point of attachment of link 139 to arm 138; as shown in Figure 6. Upon movement of shift rod 133 in either direction, from neutral position, the line of tension of spring 140 is moved to one side of the axis of rod 133, this spring then acting to complete the throw of cam 132 for shifting transmission shaft 105 lengthwise. In Figure 7 the parts are shown in the positions which they occupy when shaft 105 has been shifted upward, as viewed in Figures 6 and 7, so as to bring one of the cones 122 into driving contact with the drive cone 96 under driving pressure contact, as shown in Figure 7, in which position that transmission cone is locked by the cam 132, spring 140 being effective for maintaining predetermined driving contact pressure between the transmission cone and the drive cone. In like manner, if rod 133 be turned in the opposite direction so as to move the line of tension of spring 140 beyond center, the spring and associated parts will function to shift shaft 105 in the opposite direction, so as to bring the other transmission cone into friction driving contact with drive cone 96, and lock the shaft in such position while maintaining the transmission cone in contact with the drive cone under predetermined driving contact pressure.

An operating arm 143 is secured upon the upper end of shift rod 133 and is connected, by a link 144 (Figures 2 and 5), to an arm 145 secured upon the inner end of a stud shaft 146 rockably mounted through the outer or left hand side wall of hood 32. A control lever 147 is secured upon the outer end of stud shaft 146 and extends upward therefrom, in position to be readily grasped by the operator upon seat 35. Control lever 147 is provided with an integral detent 148 projecting toward hood 32, for engagement in a corresponding central recess 149 in a resilient rack 150 (Figures 2 and 8) secured to the side wall of hood 32. When detent 148 is engaged in recess 149, cam 132 is in neutral position, with transmission shaft 105 and the transmission cones 122 occupying the positions shown in Figure 6, tension spring 140 being then in on dead center position. By releasing lever 147 from rack 150, which may be accomplished by moving this lever a short distance in either direction, as indicated by the arrows in Figure 8, shift rod 133 is turned so as to move the line of tension of spring 140 beyond center position, after which the spring and associated parts act to shift transmission shaft 105 and complete the throw thereof, so as to move one of the transmission cones 122 into driving pressure contact with the drive cone 96, in the manner previously described.

Sprocket wheel 107, secured upon the inner end of transmission shaft 105, receives a sprocket chain 152 passing thereabout and about a sprocket wheel 153 secured on counter-shaft 26. That provides driving connection from the transmission shaft 105 to rear axle 21, by means of which the truck may be driven either forwardly or rearwardly, as required, by proper adjustment of the transmission shaft.

By means of the control lever 147 the effective pressure contact between either of the transmission cones 122 and the drive cone 96 may be regulated to a nicety, in opposition to the tension of spring 140, to permit of slippage between the cones, and the operator can readily determine by feel through the control lever 147 the amount of slippage thus permitted. That is of particular advantage in starting from standstill under heavy load, since it permits of starting the truck under considerable initial slippage and gradually decreasing the slippage as the truck comes up to speed, thus avoiding stalling of the engine. Since the friction wear surface is on the drive cone 96, as previously noted, such slippage is not objectionable and will not result in flats being worn upon the cones 122, the wear on cone 96 being distributed uniformly about the latter, which maintains it to conical shape.

With the operator upon seat 35, and the engine disposed at the left hand side of the truck, the weight is so distributed that more weight is disposed at the left hand side of the lengthwise axis of the truck than at the right hand side thereof. That is advantageous in that the weight at the left hand side of the truck permits of long lengths being carried upon the unobstructed deck portion of the platform, to the right of the engine hood, without objectionably disturbing stability of the truck, since the weight of articles disposed upon the deck portion will be compensated for, to considerable extent at least, by the extra weight of the truck at the left hand side thereof. On the other hand, disposal of the front steering wheel to the left hand side of the lengthwise axis of the truck, as previously described, permits of short turns being made and eliminates likelihood of tipping over of the truck when making short turns, as will be obvious. Since the left hand rear wheel of the truck is the driven wheel, the reaction thereof also tends to counteract any tendency to tipping over of the truck due to the greater portion of the weight, when unloaded, being at the left hand portion of the truck.

Referring to Figure 3, more particularly, it will be noted that the means for adjusting the transmission shaft 105 lengthwise is disposed at the outer end of that shaft, the countershaft 26 is disposed between and parallel with transmission shaft 105 and axle 21, the drive between the transmission shaft 105 and the countershaft 26 is from the inner end of shaft 105 to shaft 26, at the opposite side of sprocket wheel 30 from the brake means 31, the latter being at the end of countershaft 26 more remote from the transmission cones. The transmission and associated countershaft and the axle 21, together with the brake means, are thus so disposed as to provide a compact arrangement, which occupies comparatively little space and in which all of the cooperating parts may readily be accommodated in a manner such as to require but comparatively little floor clearance for the body of the truck.

In order that the power of the engine may be utilized for propelling the truck, to maximum advantage, we provide novel air cooling means for the engine, which does not consume any useful portion of the power thereof, such as occurs where a cooling fan or like cooling means is employed. Referring more particularly to Figures 11 to 14, inclusive, each cylinder 68 of the engine is provided with circumferential cooling fins and has, at its outer end, a head 155 of generally rectangular form as viewed from its outer face, this head also being provided with cooling fins a number of which extend the full width of the head, as shown in Figure 12. A sheet metal casing 156 encloses each cylinder head 155. This casing comprises a base plate 157 secure about cylinder 68 adjacent the inner face of head 155 and provided, at its lower edge, with an integral flange 158 extending beneath cylinder head 155. A box-like body 160 extends over and about cylinder head 155 and is provided with a flange 161 extending about one end and the top thereof, this flange being secured to plate 157 in a suitable manner, as by means of screws 162 and associated nuts 163. Bottom wall 164 of body or cover 160 is provided with slots 165, which fit about bolting lugs 166 formed integrally with cylinder head 155 at the bottom thereof. Bolts 167 pass through filler plate 141, flange 158 of plate 157, and bosses 166. Nuts 167a are screwed onto the upper ends of bolts 167, and flange 158 is clamped between bosses 166 and filler plate 141, as shown in Figures 12 and 13. In the case of the cylinder at the inner side of the engine, the bolts 167 pass through frame member 41, as shown in Figure 3.

Casing 156 is provided, at its rearward end, with an upwardly projecting and forwardly opening hood 169, and with a flange 170 secured by screw and nut means to the rearward edge portion of plate 157. Adjacent its forward end base plate 157 is provided with an outwardly offset arcuate portion 171, which receives the upper inner portion of a cylindrical tube 172, which extends downward through the bottom and one side of casing 156. Tube 172 extends upwardly within casing 156 for a considerable distance and projects downwardly through this casing for approximately one-half of its length, this tube being inclined downwardly and the two tubes being disposed a short distance in front of the engine flywheel 72 and converging downward, as shown in Figure 3. An exhaust pipe or conduit 173 leads from each cylinder head 155 and curves downward into the upper end portion of tube 172, this exhaust pipe being of less diameter than the interior diameter of tube 172 and having its lower end spaced a considerable distance above the lower end of the tube.

In the operation of the engine, the exhaust gases are discharged through exhaust pipe 173 under considerable velocity, expelling the air from the lower portion of this tube, as indicated in Figure 14, thus creating a partial vacuum within casing 156 and inducing air into this casing through hood 169. The entering air flows about and across the engine head 155, lengthwise of casing 156 and parallel with and between the longer cooling fins on the outer face of the engine head, as indicated by the arrows in Figure 12, thence into the upper end of tube 172 through which the air is discharged to atmosphere. In this manner, the exhaust of the engine produces a continuous flow of cooling air over the engine head and exhaust pipe, and between the fins of the engine head, cooling the engine in an efficient manner and avoiding all necessity of utilizing a portion of the engine power for driving a fan or other cooling apparatus. The higher the engine speed or power, the greater is the amount of air flowing through casing 156 and, therefore, the greater the cooling effect. Further, the casings 156 occupy but little more space than the engine heads and appurtenant parts, no additional space being required to accommodate such casings. That is of advantage as reducing the necessary space occupied by the engine and the parts appurtenant thereto, thereby reducing the necessary overall dimensions of the engine hood.

In certain figures of the drawings, particularly Figures 2, 4 and 5, the casings 156 about the cylinder heads have been omitted, for clearness of illustration. It will be understood, however, that we contemplate using the engine cooling means, comprising the casings 156 and associated elements, in all cases where cooling of the engine is either necessary or desirable. It will further be seen that this particular means for cooling the engine is of advantage as being conducive to a light weight power plant, which is desirable in an industrial truck. Further, since the exhaust gases are mixed with relatively large volumes of cooling air, the temperature of such gases is lowered thereby reducing the fire hazard.

The construction of the oil pan is shown more in detail in Figures 9 and 10. It is, in general, of box-like formation, being provided through its top wall with a rectangular opening surrounded by a bolting seat or flange 175, appropriately bored and tapped for reception of bolts by means of which the crank case 67 is bolted to the oil pan, and may also be bored and tapped for bolts or screws for attaching appurtenant devices to the engine. Adjacent its rearward end oil pan 66 is provided with a transverse thickened rib 176 appropriately bored and tapped, for reception of cap screws by means of which bearing sleeve structure 69, for the rearward portion of crank shaft 70, is secured to the top wall of the oil pan. Rib 176 is further bored and tapped, adjacent one end thereof, to provide an oil opening normally closed by a screw plug 177. At its rearward end, between the arms 91 and 92, oil pan 66 is provided with a rearwardly projecting slotted foot or pad 178, bolted to cross member 180 of frame 15, as shown more clearly in Figure 4, an adjusting screw 181 being threaded through the vertical arm of member 180 and contacting the rearward end of member 178, for effecting adjustment of the engine forwardly relative to the frame, in mounting of the engine. The bottom of oil pan 66 is closed by a ribbed bottom plate 183, bolted thereto and provided with a drainage opening normally closed by a screw plug 184, as shown more clearly in Figure 3.

A tank T, also disposed beneath engine hood 32, is provided for supplying fuel, such as gasoline, to the carburetor 75, which delivers an appropriate fuel mixture to the cylinders of engine 65.

It will be noted that the platform and the frame of the truck are unsprung from the rear axle 21 and the front fork 54. The pneumatic tires 25 and 56 are of ample dimensions and of large cross-section relative to the ground wheels, and suffice to cushion effectively shocks due to the ground wheels encountering unevennesses in the traction surface, or articles thereon, while preventing stalling of the engine from such causes, as previously noted. The use of the pneumatic tires in the manner referred to has the advantages stated, and has the additional advantage that it eliminates necessity of supporting springs for the frame and platform of the truck, which accordingly has exceptionally small clearance, particularly desirable in industrial trucks.

While we preferably employ an engine and transmission of the particular construction herein disclosed, that is not essential to our invention in certain of the broader aspects thereof, as will appear from the above. We do not, therefore, intend to be limited to the particular details of our invention as herein disclosed, except in so far as we may be so limited by the appended claims.

We claim:

1. In an industrial truck of the character described, a frame and a platform carried thereby, a rear axle extending transversely of said frame and ground wheels on said axle, an internal combustion engine adjacent one side of said frame with its crank shaft disposed lengthwise thereof, a horizontal transmission shaft mounted for lengthwise movement adjacent the rearward end of said engine with its axis intersecting the axis of the engine crank shaft, a friction drive cone secured on the rearward end of the latter shaft, two friction transmission cones keyed on said transmission shaft at opposite sides of said drive cone and movable into and out of contact therewith by lengthwise adjustment of said transmission shaft, a countershaft between and parallel with said transmission shaft and said axle, adjusting means connected to the outer end of said transmission shaft, flexible driving connections between the inner end of said transmission shaft and said countershaft, and driving connections between said countershaft and said axle.

2. In an industrial truck of the character described, a rear axle and two ground wheels thereon, an internal combustion engine comprising a crank shaft, a friction drive cone secured on one end of said shaft, a transmission shaft movable lengthwise, driving connections between said rear axle and said transmission shaft, two friction transmission cones secured on said transmission shaft at opposite sides of said drive cone, and means for adjusting said transmission shaft lengthwise for selectively moving said transmission cones into and out of contact with said drive cone, said adjusting means comprising yielding means and supplementary means for locking said transmission cones in driving pressure contact with said drive cone and for variably reducing the effective pressure between said drive and transmission cones in opposition to said yielding means.

3. In an industrial truck of the character described, a rear axle and two ground wheels thereon, an internal combustion engine comprising a crank shaft, a friction drive cone secured on one end of said shaft, a transmission shaft, driving connections between said rear axle and said transmission shaft, two friction transmission cones mounted on said transmission shaft with driving connection thereto, at opposite sides of said drive cone, and means for adjusting said transmission cones axially of said transmission shaft for selectively moving them into and out of contact with said drive cone, said adjusting means comprising yielding means and supplementary means for locking said transmission cones in driving pressure contact with said drive cone and for variably reducing the effective pressure between said drive and transmission cones in opposition to said yielding means.

4. In a drive unit for an industrial truck, an internal combustion engine comprising a crank shaft, arms rigid with and projecting from said engine beyond said shaft at one end and at opposite sides thereof, a friction drive cone secured on said end of said shaft, a transmission shaft supported by said arms, friction transmission cones secured on said transmission shaft at opposite sides of said drive cone, and means for selectively moving said transmission cones into and out of contact with said drive cone.

5. In a drive unit for an industrial truck, an internal combustion engine comprising a crank shaft, arms rigid with and projecting from said engine beyond said shaft at one end and at opposite sides thereof, a friction drive cone secured on said end of said shaft, a transmission shaft mounted on said arms for lengthwise movement, friction transmission cones secured on said transmission shaft at opposite sides of said drive cone, and means for adjusting said transmission shaft lengthwise for selectively moving said transmission cones into and out of contact with said drive cone.

6. In a drive unit for an industrial truck, an internal combustion engine comprising an oil pan and a crank shaft, arms integral with and projecting from said oil pan beyond said shaft at one end and at opposite sides thereof, a friction drive cone secured on said one end of said shaft, a transmission shaft mounted on said arms for rotation and lengthwise movement, friction transmission cones keyed on said transmission shaft, and means connected to one end of said transmission shaft for adjusting it lengthwise for selectively moving said transmission cones into and out of contact with said drive cone.

7. In a drive unit for an industrial truck, a drive shaft, a friction drive cone secured on one end of said shaft, a transmission shaft, friction transmission cones mounted on said transmission shaft with driving connection thereto, at opposite sides of said drive cone, and means for adjusting said transmission cones axially of said transmission shaft for selectively moving them into and out of contact with said drive cone, said adjusting means comprising cam means, yielding means for turning said cam means into either of two operative positions effective for locking said transmission cones selectively in driving pressure contact with said drive cone, and means for variably reducing the effective pressure between said drive and transmission cones.

8. In a drive unit for an industrial truck, a drive shaft, a friction drive cone secured on one end of said shaft, a transmission shaft adjustable lengthwise, friction transmission cones keyed on said transmission shaft at opposite sides of said drive cone, a yoke attached to one end of said transmission shaft, a cam cooperating with said yoke for shifting said transmission shaft lengthwise in either direction, over-center spring means connected to said cam for completing throw of said transmission shaft and locking the latter in adjustment with the corresponding transmission cone in driving pressure contact with said drive cone, and means for manually adjusting said cam in opposition to said spring means for effecting adjustment of said transmission shaft and for variably reducing the effective pressure between said drive and transmission cones.

9. In a drive unit for an industrial truck, an internal combustion engine comprising a crank shaft and provided with two integral arms projecting beyond and at opposite sides of one end of said shaft, a friction drive cone secured on said end of said shaft, a transmission shaft mounted for rotation and lengthwise movement on said arms, friction transmission cones secured on said transmission shaft at opposite sides of said drive cone, a yoke attached to one end of said transmission shaft, a cam within said yoke cooperating therewith for shifting said transmission shaft, an arm secured to said cam, an over-center tension spring attached to said arm effective for completing throw of said cam in either direction and locking said transmission shaft in lengthwise adjustment with one of said transmission cones in driving pressure contact with said drive cone, a control lever connected to said cam for adjusting it in opposition to said spring, and means for releasably holding said lever in neutral position with said spring on center and said transmission shaft in neutral position holding said transmission cones out of contact with said drive cone.

10. In an industrial truck of the character described, a frame having at its front a forwardly tapering nose, two rear ground wheels adjacent the sides of said frame, a power plant for driving said truck adjacent the front and one side of said frame and spaced from the other side thereof, a dirigible ground wheel disposed beneath said nose in front of said power plant adjacent the inner side thereof and nearer said one side of said frame than said other side of the latter, and an operator's seat overlying said power plant.

LAWRENCE M. VILES.
HUGH S. BROWN.